Sept. 29, 1931.        H. B. LERMER         1,824,907
                         CONTAINER
                      Filed Aug. 9, 1929

INVENTOR
Herman B. Lermer
BY
Fred C. Fischer
ATTORNEY

Patented Sept. 29, 1931

1,824,907

UNITED STATES PATENT OFFICE

HERMAN B. LERMER, OF NEWARK, NEW JERSEY, ASSIGNOR TO HYGIENIC TUBE CO., OF NEWARK, NEW JERSEY, A CORPORATION OF NEW JERSEY

CONTAINER

Application filed August 9, 1929. Serial No. 384,571.

This invention relates to containers, and more particularly to the provision of a container made of transparent material so that the contents may be visible.

Food and other products are usually put up in cans made of tin or similar metals. In some instances food products are contained in transparent glass jars; but the glass is not flexible and is easily broken.

It is an object of this invention to provide a container formed preferably from a transparent, impervious material, such as pyroxylin or cellulose acetate which may be readily crimped with a metallic cover to obtain an airtight joint.

Figure 1:
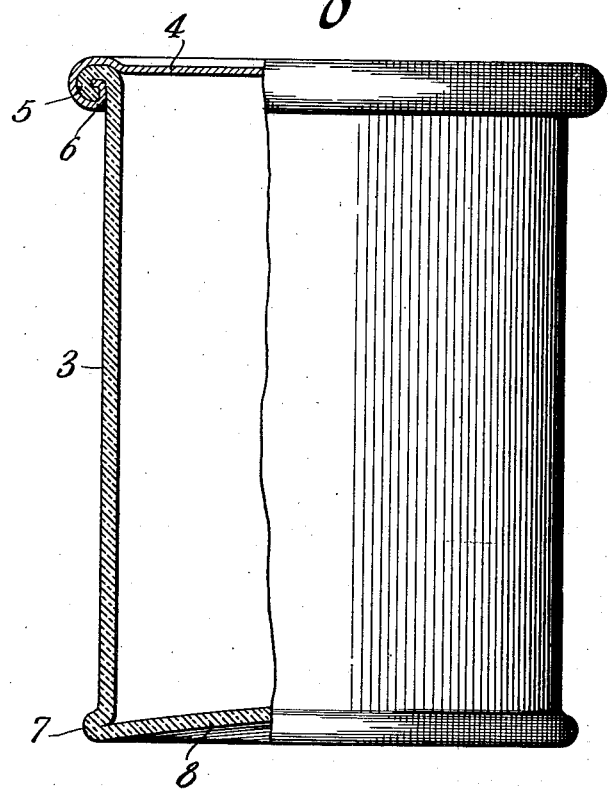
Figure 2:
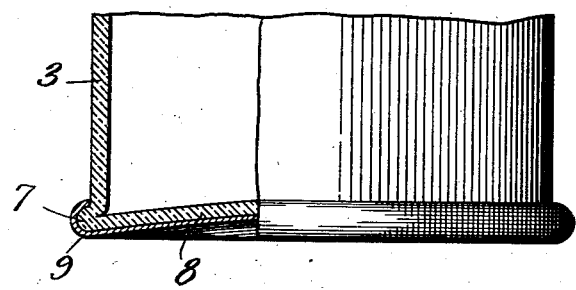

These and other objects are attained by the novel construction, combination and arrangement of parts hereinafter described and shown in the accompanying drawings, constituting a material part of this disclosure, and in which:

Fig. 1 is a cross-sectional view of a cylindrical container having transparent walls and a metallic cover, and Fig. 2 is a sectional view of a modified form of the container shown in Fig. 1.

Referring to the drawings, the container is shown to comprise a cylindrical body 3 of preferably noninflammable pyroxylin or cellulose acetate, or similar transparent and flexible material.

The body has an integral bottom 8 and the junction of the bottom with the body may be beaded as at 7, in order to provide reenforcement at the points of contact of the container with a supporting surface, if it should be so desired.

The container is provided with a metallic cover 4, which is crimped at 6 with the upper edge 5 of the body 3. It will be readily seen that the crimping at 5 and 6, provides an airtight joint in a manner similar to that obtained with metal containers.

In the modified form shown in Figure 2, the bottom of the container is covered with a metallic cup 9 which serves to strengthen and reinforce the bottom and minimize the possibilities of breakage during handling and shipping.

From the above description it will be seen that I have provided a transparent container for foods and other products, which container may be rendered air-tight without resorting to the use of paraffine, wax and the like. All the advantages of the usual transparent glass container are obtained from my container, and in addition, the filling and sealing of my container may be accomplished as conveniently and quickly as when metal containers are used.

The foregoing disclosure is to be regarded as descriptive and illustrative only, and not as restrictive or limitative of the invention, of which obviously an embodiment may be constructed including modifications without departing from the general scope herein indicated and denoted in the appended claim.

Having thus described my invention, what I claim as new and desire to secure by Letters Patent, is:

A container comprising a cylindrical body composed of transparent impermeable and limitedly exible material, an arcuately raised bottom of the same material integral with the body, said bottom having a bead at the juncture of the body and the bottom, a metallic cap fitting over the bottom and around the bead, and a metallic cover adapted to be crimped together with the upper edge of the body to provide an air tight joint.

This specification signed and witnessed this 29th day of July, 1929.

HERMAN B. LERMER.